March 11, 1924.
G. C. HACKSTAFF
1,486,243
PROCESS FOR TREATMENT OF OIL SHALE AND APPARATUS THEREFOR
Filed April 19, 1920
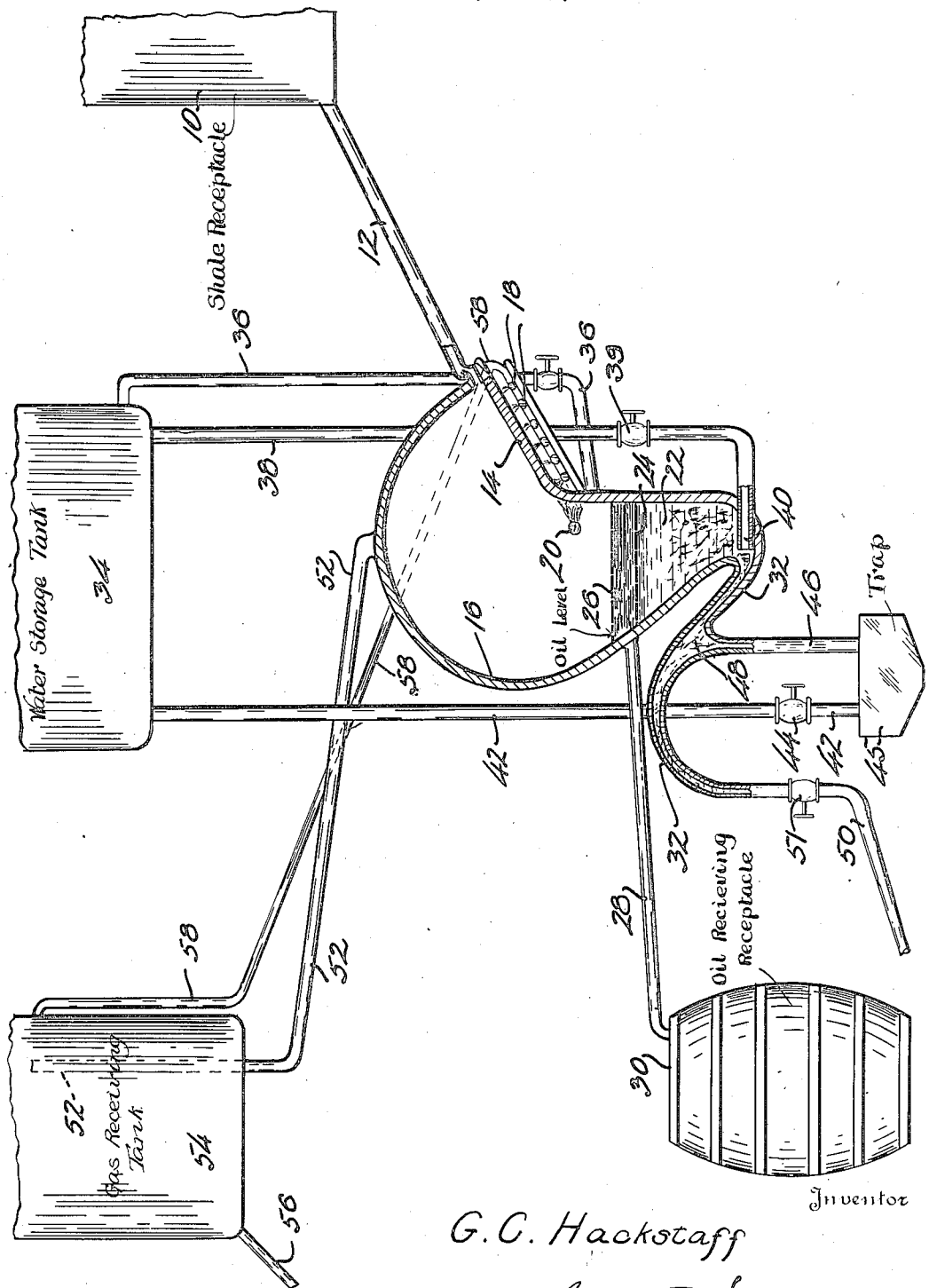
Inventor
G. C. Hackstaff
By
Attorney Patented Mar. 11, 1924.

1,486,243

UNITED STATES PATENT OFFICE.

GEORGE C. HACKSTAFF, OF DENVER, COLORADO.

PROCESS FOR TREATMENT OF OIL SHALE AND APPARATUS THEREFOR.

Application filed April 19, 1920. Serial No. 374,781.

*To all whom it may concern:*

Be it known that I, GEORGE C. HACKSTAFF, a citizen of the United States, residing at the city and county of Denver and State of Colorado, have invented certain new and useful Improvements in Processes for Treatment of Oil Shale and Apparatus Therefor; and I do declare the following to be a full, clear, and exact description of the invention, such as will enable others skilled in the art to which it appertains to make and use the same, reference being had to the accompanying drawing and to the characters of reference marked thereon, which form a part of this specification.

The object of this invention is to provide a comparatively simple and efficient means for handling oil shales and the like, whereby oily constituents thereof, both volatile and liquid, may be economically recovered and whereby metallic values, such as gold, may also be recovered.

The shale or other rock is preferably prepared in granular form by the process described and claimed in Patent No. 1,219,408, granted to George C. Hackstaff and George B. Holden. Said material is fed into a retort having an inclined heated surface whereby the material is thoroughly heated as it moves down said surface. As it falls from the edge thereof it is sprayed with water, thereby breaking the shale into smaller particles and releasing the oily elements. The water, oil and shale fall into the bottom of the receptacle, where the oil gathers upon the surface of the water and is removed. The resulting gases are removed from the top of the chamber and the pulp or shale and water are removed continuously from the bottom thereof. A trap is provided for collecting the heavy values, such as gold, which the oil may carry.

The drawing shows diagrammatically the apparatus used for this process.

A receptacle 10 is provided for receiving the granular material, and a feed duct 12 leads therefrom to an inclined heated plate 14 within a treating chamber or retort 16, the plate 14 being heated by means of gas burners 18. As the heated material falls from the end of the plate 14, it is sprayed with water issuing from a pipe 20. This breaks up the shale into small particles and also assists in the breaking down of the oily constituents. The resulting oil, water and shale are collected in the bottom of the retort, the water and shale producing a pulp body, as indicated at 22, the water level being indicated by the heavy line at 24, and the level of the oil which floats upon the water being indicated at 26. The oil may be drawn off continuously through a pipe 28 into a receptacle 30. The pulp is continuously drawn off from the bottom of the retort through a goose-neck 32.

Water is contained in the storage tank 34 and is conducted therefrom by means of a pipe 36, to the spray pipe 20. Water is also conducted from the tank 34 by means of a pipe 38 controlled by a valve 39 to a nozzle 40, which enters the bottom of the retort 16 and is positioned to direct a current of water into the goose-neck 32. In this manner the pulp is drawn from the bottom 22 of the retort 16 and discharged from the opposite end of the goose-neck.

A third water pipe 42, controlled by valve 44, leads from the tank 34 to a trap 45 for heavy values. A pipe 46 leads upwardly from the top of the trap to the goose-neck 32, and joins the same at the point 48, where a cavity of some size is formed. At this point the heavy minerals, such as gold, which are removed by the current issuing from the nozzle 40, separate from the moving pulp and fall through the pipe 46 into the trap 45, against the current of water moving upward therein, which is so regulated by valve 44 that it has sufficient force to oppose downward movement of shale, but will permit the gold or the like to fall. The lower end of the goose-neck is provided with a discharge pipe 50, controlled by a valve 51, to regulate said discharge. The gases are removed from the top of the retort 16 into a gas-receiving tank 54, which is provided at its bottom with a take-off 56, for any liquids which may condense therein. A portion of the gas received in said tank may be carried by means of a pipe 58 to the gas burners 18 for heating the plate 14.

From the foregoing, it will be seen that a simple process and apparatus has been provided for breaking up oil shale so that it will quickly give up its oily constituents, and whereby said constituents may be readily recovered.

I claim:

1. A process of treating oil shale and the like, comprising advancing the shale, heating the same as it advances, spraying it with water after heating, collecting the shale.

water and resulting oil, and allowing the oil to accumulate on the surface of the water, continuously drawing off the water and shale from below and drawing off the supernatant oil.

2. A process for treating oil shale and the like, comprising feeding the shale along an incline, heating the same as it travels its inclined path, allowing it to fall after heating, and spraying it with water as it falls, collecting the shale water and resulting oil, and allowing the oil to accumulate on the surface of the water.

3. Apparatus for treatment of oil shale and the like, comprising an inclined heated plate, means for feeding shale to the plate, means for spraying the shale as it leaves the plate, and means for collecting the resulting products, said collecting means being provided with means for drawing off the resulting pulp and with means for drawing off the supernatant oil.

4. Apparatus for treatment of oil shale and the like, comprising means for heating the shale, means for spraying the heated shale with water, means for collecting the resulting products, said collecting means being provided with means for drawing off the resulting pulp and with means for drawing off the supernatant oil, said means for drawing off the pulp comprising a goose-neck leading from the bottom of said collecting means, and a nozzle to direct a water current into said gooseneck.

5. Apparatus for treatment of oil shale and the like, comprising means for heating the shale, means for spraying the heated shale with water, means for collecting the resulting products, said collecting means being provided with means for drawing off the resulting pulp and with means for drawing off the supernatant oil, said means for drawing off the pulp comprising a goose-neck leading from the bottom of said collecting means, a nozzle to direct a water current into said gooseneck, and a trap communicating with an intermediate portion of said gooseneck for receiving metals separating from the pulp.

6. Apparatus for treatment of oil shale and the like, comprising a retort having a heated inclined plate, means for feeding shale down said plate, means for spraying the heated shale with water as it leaves said plate, said retort being adapted to receive the resulting oil and pulp in the bottom thereof, means for drawing off the pulp, and means for drawing off the supernatant oil, said means for drawing off the pulp comprising a gooseneck and a nozzle for directing a current of water into said gooseneck to enter in the pulp at the bottom of the retort.

In testimony whereof I affix my signature.

GEORGE C. HACKSTAFF.